United States Patent
Huang et al.

(10) Patent No.: US 8,427,466 B2
(45) Date of Patent: Apr. 23, 2013

(54) IMAGE-PROCESSING CIRCUIT, RELATED SYSTEM AND RELATED METHOD CAPABLE OF REDUCING POWER CONSUMPTION

(75) Inventors: Ming-Sung Huang, Hsinchu County (TW); Wen-Min Lu, Hsinchu (TW)

(73) Assignee: Etron Technology, Inc., Hsinchu (TW)

( * ) Notice: Subject to any disclaimer, the term of this patent is extended or adjusted under 35 U.S.C. 154(b) by 977 days.

(21) Appl. No.: 12/350,934

(22) Filed: Jan. 8, 2009

(65) Prior Publication Data
US 2010/0073345 A1   Mar. 25, 2010

(30) Foreign Application Priority Data
Sep. 24, 2008 (TW) .............................. 97136613 A

(51) Int. Cl.
*G09G 5/00* (2006.01)
(52) U.S. Cl.
USPC ............ 345/211; 345/212; 345/213; 345/214

(58) Field of Classification Search .............. 345/87–98, 345/204–205, 210–215, 530–536
See application file for complete search history.

(56) References Cited

U.S. PATENT DOCUMENTS

| | | | |
|---|---|---|---|
| 6,836,273 B1 * | 12/2004 | Kadono | 345/543 |
| 2002/0024481 A1 | 2/2002 | Kawabe | |
| 2003/0193460 A1 * | 10/2003 | Lee et al. | 345/87 |
| 2004/0218334 A1 * | 11/2004 | Martin et al. | 361/139 |
| 2006/0214927 A1 * | 9/2006 | Ikeda et al. | 345/204 |
| 2007/0146273 A1 * | 6/2007 | You | 345/89 |
| 2008/0174591 A1 * | 7/2008 | Park et al. | 345/212 |

* cited by examiner

*Primary Examiner* — William L Boddie
*Assistant Examiner* — Sahlu Okebato
(74) *Attorney, Agent, or Firm* — Winston Hsu; Scott Margo

(57) ABSTRACT

An image processing circuit turns off the writing unit of the controller of the DRAM when the previous frame is identical to the current frame. In this way, the writing unit of the controller of the DRAM does not write the current frame into the DRAM, thereby reducing power consumption.

16 Claims, 3 Drawing Sheets

US 8,427,466 B2

IMAGE-PROCESSING CIRCUIT, RELATED SYSTEM AND RELATED METHOD CAPABLE OF REDUCING POWER CONSUMPTION

BACKGROUND OF THE INVENTION

1. Field of the Invention

The present invention relates to an image-processing circuit, and more particularly, to an image-processing circuit capable of reducing power consumption

2. Description of the Prior Art

Reference is made to FIG. 1 for a diagram of a prior art over-drive system 100. The over-drive system 100 can receive original frame data (such as frame (n−1), frame n and frame (n+1) depicted in FIG. 1), perform over-drive on the received frame data, and send the processed frame data to a liquid crystal display (LCD) device for displaying images. Over-drive technique is preferred due to its ability of accelerating the reaction rate and thus enhancing display quality of the LCD device. The over-drive system 100 includes an over-drive circuit 110 and a dynamic random access memory (DRAM) 120. The DRAM 120 is used for storing frame data, such as frame (n−1), frame n and frame (n+1) depicted in FIG. 1. By comparing the frame data stored in the DRAM 120 with that received by the over-drive system 100, the over-drive circuit 110 generates an over-drive frame accordingly. For example, upon receiving frame (n−1), the over-drive circuit 110 stores frame (n−1) into the DRAM 120; upon receiving frame n, the over-drive circuit 110 stores frame n into the DRAM 120, accesses frame (n−1) from the DRAM 120, and then compares frame (n−1) with frame n; upon receiving frame (n+1), the over-drive circuit 110 stores frame (n+1) into the DRAM 120, accesses frame n from the DRAM 120, and then compares frame n with frame (n+1). If frame (n+1) and frame n are identical, frame n is outputted directly for image display; if frame (n+1) differs from frame n, an over-drive frame, which is generated based on an over-drive table stored in the over-driver circuit 110, is then outputted for image display.

Therefore, each time the over-drive system 100 receives a frame, data needs be stored into the DRAM 120. The prior art system has high power consumption and can cause inconveniences for users.

SUMMARY OF THE INVENTION

It is therefore one of the primary objectives of the claimed invention to provide circuits, systems and methods of image-processing circuit capable of reducing power consumption.

According to an exemplary embodiment of the claimed invention, an image-processing circuit capable of reducing power consumption is disclosed. The image-processing circuit includes a frame input end for receiving frames; a frame output end for outputting frames after being processed by the image-processing circuit; a memory controller comprising a writing unit and a reading unit, and a comparator. The writing unit of the memory controller includes an input end coupled to the frame input end for receiving frames; a control end for receiving a control signal; and an output end coupled to a first memory, wherein the writing unit stores the frames received from the input end of the writing unit into the first memory via the output end of the writing unit based on the control signal. The reading unit of the memory controller includes an input end coupled to the first memory for accessing frames stored in the first memory and an output end for outputting the accessed frames. The comparator includes a first input end coupled the output end of the reading unit for receiving frames outputted from the reading unit; a second input end coupled the frame input end for receiving frames; and an output end coupled to the writing unit for outputting the control signal when a frame received from the first input end of the comparator is identical to a frame received from the second input end of the comparator.

According to another exemplary embodiment of the claimed invention, an image-processing system capable of reducing power consumption is disclosed. The image-processing system includes a first memory for storing frames and an image-processing circuit. The image-processing circuit includes a frame input end for receiving frames; a frame output end for outputting frames after being processed by the image-processing circuit; a memory controller comprising a writing unit and a reading unit, and a comparator. The writing unit of the memory controller includes an input end coupled to the frame input end for receiving frames; a control end for receiving a control signal; and an output end coupled to the first memory, wherein the writing unit stores the frames received from the input end of the writing unit into the first memory via the output end of the writing unit based on the control signal. The reading unit of the memory controller includes an input end coupled to the first memory for accessing frames stored in the first memory and an output end for outputting the accessed frames. The comparator includes a first input end coupled the output end of the reading unit for receiving frames outputted from the reading unit; a second input end coupled the frame input end for receiving frames; and an output end coupled to the writing unit for outputting the control signal when a frame received from the first input end of the comparator is identical to a frame received from the second input end of the comparator.

According to another exemplary embodiment of the claimed invention, an image-processing method capable of reducing power consumption is disclosed. The image-processing method includes (a) comparing a first frame with a second frame; and (b) storing the second frame into a first memory based on a result from step (a).

These and other objectives of the present invention will no doubt become obvious to those of ordinary skill in the art after reading the following detailed description of the preferred embodiment that is illustrated in the various figures and drawings.

DETAILED DESCRIPTION

Figure 1:
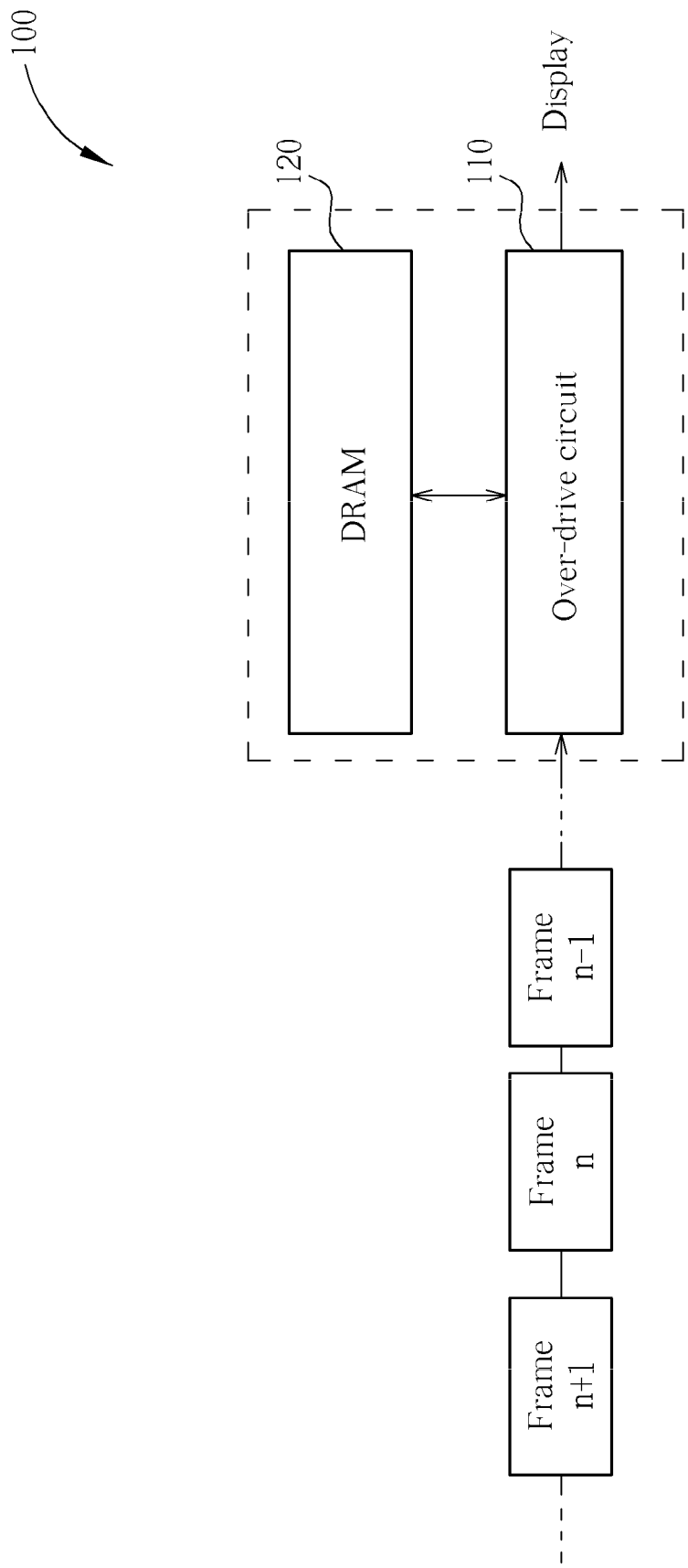
FIG. 1 is a diagram of a prior art over-drive system.
Figure 2:
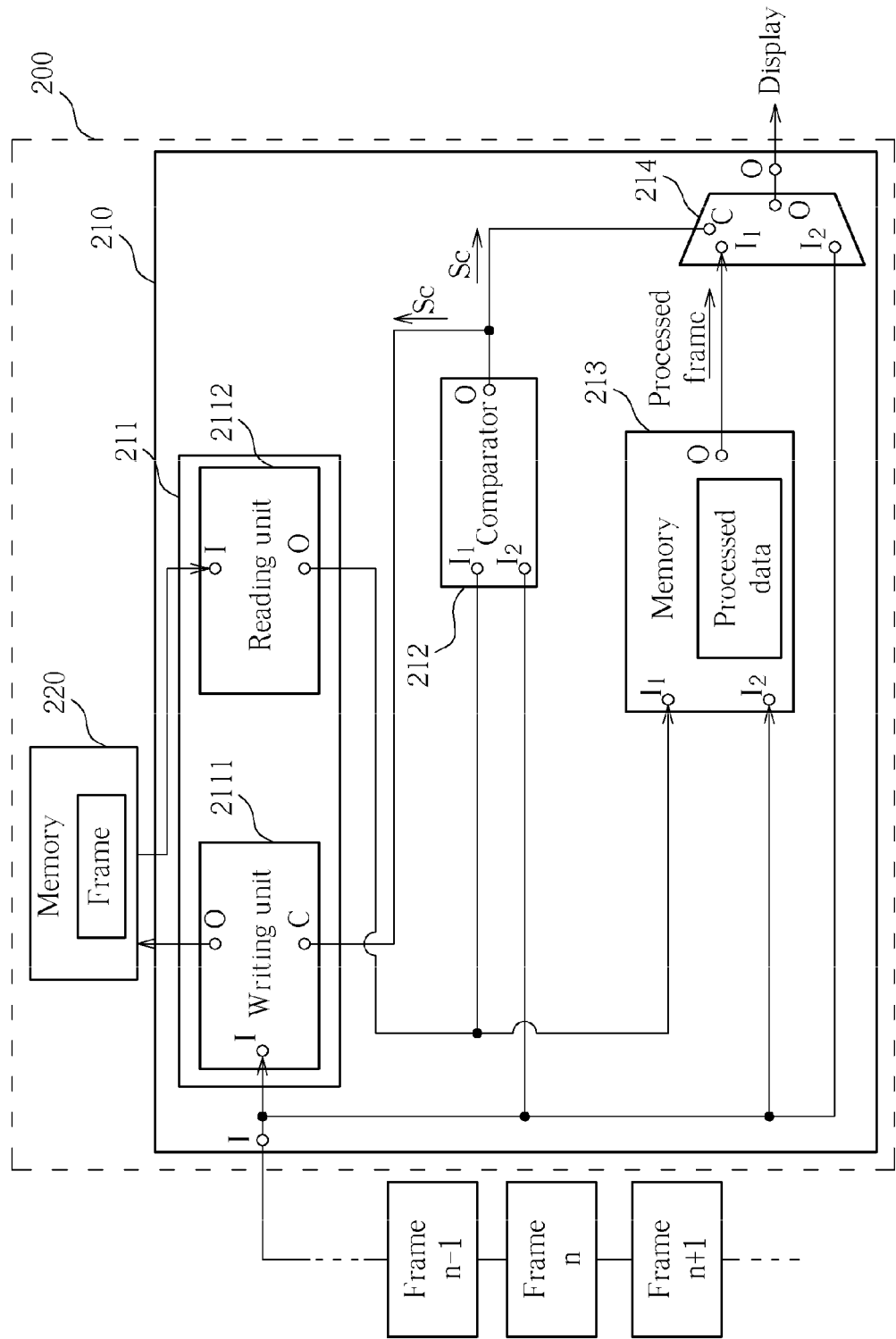
FIG. 2 is a diagram of an image-processing system according to the present invention.

Reference is made to FIG. 2 for a diagram of an image-processing system 200 capable of receiving frames and outputting processed frames according to the present invention. The image-processing system 200 can receive original frame data, (such as frame (n−1), frame n and frame (n+1) depicted in FIG. 2), perform over-drive on the received frame data, and send the processed frame data to an LCD device for image display. The image-processing system 200 includes an image-processing circuit 210 and a memory 220. The memory 220, which can be a DRAM, is used for storing frame data, such as frame (n−1), frame n and frame (n+1) depicted in FIG. 2. The image-processing system 200 can receive frames and output the processed frames. For example, by comparing the frame data stored in the memory 220 with that received by the image-processing system 200, the image-processing circuit 210 generates an over-drive frame accordingly.

The image-processing circuit 210 includes a frame input end I, a frame output end O, a memory controller 211, a comparator 212, a memory 213, and a selector 214. The frame input end I of the image-processing circuit 210 can receive original frame data, such as frame (n−1), frame n and frame (n+1) depicted in FIG. 2. The frame output end O of the image-processing circuit 210 can output the processed frame for image display.

The memory controller 211 includes a writing unit 2111 and a reading unit 2112. The writing unit 2111 includes an input end I, an output end O, and a control end C. The reading unit 2112 includes an input end I and an output end O. The comparator 212 includes input end $I_1$ and $I_2$, and an output end O. The memory 213 can store a processed data, as well as generating a processed frame based on a received frame and the stored processed data. For instance, an over-drive table can be stored in the memory 213, and an over-drive frame can be generated based on a received frame and the over-drive table. The memory 213 includes input ends $I_1$ and $I_2$, and an output end O. The selector 214 includes input ends $I_1$ and $I_2$, a control end and an output end O.

The input end I of the writing unit 2111 is coupled to the frame input end I of the image-processing circuit 210 for receiving original frames (frame 1, frame 2, frame 3 . . . , etc). The output end O of the writing unit 2111 is coupled to the memory 220 for writing the received frames into the memory 220. The control end C of the writing unit 2111 is coupled to the output end O of the comparator 212 for receiving a control signal $S_C$ sent from the comparator 212. The writing unit 2111 can then determine whether the received original frame is to be stored into the memory 220 based on the control signal $S_C$.

The input end I of the reading unit 2112 is coupled to the memory 220. The output end O of the reading unit 2112 is coupled to the input end $I_1$ of the comparator 212 and the memory 213. The reading unit 2112 can access frames stored in the memory 220, and can then send the accessed frames to the input end $I_1$ of the comparator 212 and to the memory 213 via its output end O.

The input end $I_1$ of the memory 213 is coupled to the output end O of the reading unit 2112 for receiving frames accessed by the reading unit 2112. The input end $I_2$ of the memory 213 is coupled to the frame input end I of the image-processing circuit 210 for receiving original frames. The memory 213 generates an over-drive frame based on the stored over-drive table and the frames received from its input ends $I_1$ and $I_2$. If frame (n−1) is a previous frame already stored in the memory 220, then frame n is the current frame. Under this circumstance, the reading unit 2112 accesses the stored frame (n−1), which is then sent to the input end $I_1$ of the memory 213. Frame n is also sent to the input end $I_2$ of the memory 213 via the frame input end I of the image-processing circuit 210. Therefore, the memory 213 can generate a corresponding over-drive frame based on the stored over-drive table and frames (n−1) and n.

The input end $I_1$ of the comparator 212 is coupled to the output end O of the reading unit 2112. The input end $I_2$ of the comparator is coupled to the control end C of the writing unit 2111 and the control end C of the selector 214. The comparator 212 generates the control signal $S_C$ based on the frames received from its input ends $I_1$ and $I_2$. To be more precise, the comparator 212 outputs the control signal $S_C$ when a frame received from its input end $I_1$ is identical to that received from its input end $I_2$. If frame (n−1) is a previous frame already stored in the memory 220, then frame n is the current frame. Under this circumstance, the reading unit 2112 accesses frame (n−1) from the memory 220, and then sends frame (n−1) to the input end $I_1$ of the comparator 212. Frame n is also sent to the input end $I_2$ of the comparator via the frame input end I of the image-processing circuit 210. Therefore, the comparator 212 can determine whether frame (n−1) and frame n are identical. If frame (n−1) and frame n are different, the comparator 212 does not output the control signal $S_C$; if frame (n−1) and frame n are identical, the comparator 212 outputs the control signal $S_C$.

Assuming frame (n−1) has been stored in the memory 220 and frame n is the current frame, the comparator 212 does not output the control signal $S_C$ if frame (n−1) and frame n are different. Instead, the writing unit 2111 stores the current frame (frame n) into the memory 220. On the other hand, the comparator 212 outputs the control signal $S_C$ if frame (n−1) and frame n are identical, thereby turning off the writing unit 2111. To be more precise, since frame (n−1) and frame n are identical, it is not necessary for the writing unit 2111 to store frame n into the memory 220. Upon receiving the next frame (frame (n+1)), the previously stored frame (n−1) can still be accessed for comparison. Therefore, the present invention can reduce power consumption by reducing unnecessary data access between the writing unit 2111 and the memory 220.

The input end $I_1$ of the selector 214 is coupled to the memory 213 for receiving the over-drive frames generated by the memory 213. The input end $I_2$ of the selector 214 is coupled to the frame input end I of the image-processing circuit 210 for receiving original frames. The control end C of the selector 214 is coupled to the output end O of the comparator 212. The output end O of the selector 214 is coupled to the frame output end O of the image-processing circuit 210 for outputting display frames.

Assuming frame (n−1) has been stored in the memory 220 and frame n is the current frame, the comparator 212 does not output the control signal $S_C$ to the selector 214 if frame (n−1) and frame n are different. In this case, the selector 214 couples its input end $I_1$ to its output end O, thereby outputting the over-drive frame generated by the memory 213 for image display. On the other hand, the comparator 212 outputs the control signal $S_C$ to the selector 214 if frame (n−1) and frame n are identical. In this case, the selector 214 couples its input end $I_2$ to its output end O, thereby directly outputting the current frame (frame n) for image display.

Figure 3:
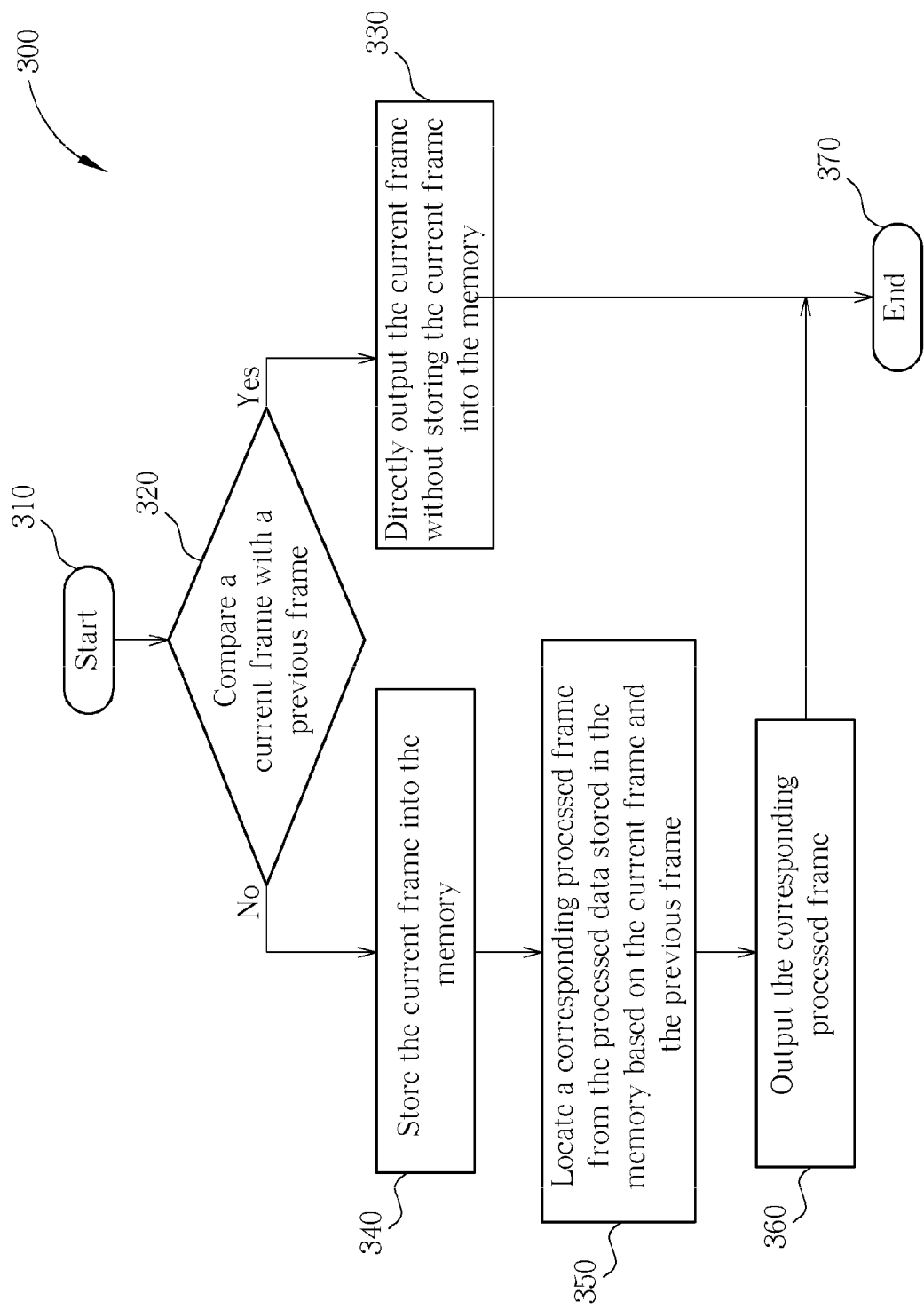
FIG. 3 is a flowchart illustrating an image-processing method according to the present invention.

Reference is made to FIG. 3 for a flowchart illustrating an image-processing method 300 capable of reducing power consumption based on the image-processing system 200. The flowchart in FIG. 3 includes the following steps:

Step 310: start;

Step 320: compare a current frame with a previous frame; if the current frame and the previous frame are identical, execute Step 330; if the current frame and the previous frame are different, execute Step 340;

Step 330: directly output the current frame without storing the current frame into the memory 220; execute Step 370;

Step 340: store the current frame into the memory 220; execute Step 350;

Step 350: locate a corresponding processed frame from the processed data stored in the memory 220 based on the current frame and the previous frame; execute Step 360;

Step 360: output the corresponding processed frame;

Step 370: end.

In Step 350, the processed data stored in the memory 220 can include an over-drive table, and the corresponding processed frame can include a corresponding over-drive frame.

In conclusion, the present invention provides an image-processing circuit and system capable of reducing power consumption due to data access between the writing unit and the memory.

Those skilled in the art will readily observe that numerous modifications and alterations of the device and method may be made while retaining the teachings of the invention.

What is claimed is:

1. An image-processing circuit capable of reducing power consumption, comprising:
    a frame input end for receiving original frames;
    a frame output end for outputting frames after being processed by the image-processing circuit;
    a memory controller, comprising:
        a writing unit, comprising:
            an input end directly coupled to the frame input end for receiving the original frames;
            a control end for receiving a control signal; and
            an output end coupled to a first memory, wherein the writing unit stores the original frames received from the input end of the writing unit into the first memory via the output end of the writing unit based on the control signal; and
        a reading unit, comprising:
            an input end coupled to the first memory for accessing frames stored in the first memory; and
            an output end for outputting the accessed frames;
    a comparator, comprising:
        a first input end coupled to the output end of the reading unit for receiving frames outputted from the reading unit;
        a second input end coupled to the frame input end for receiving the original frames; and
        an output end coupled to the writing unit for outputting the control signal when a frame received from the first input end of the comparator is identical to a frame received from the second input end of the comparator;
    a second memory for storing a processed data, comprising:
        a first input end coupled to the frame input end for receiving the original frames;
        a second input end coupled to the output end of the reading unit for receiving frames outputted from the reading unit; and
        an output end for outputting a processed frame based on the processed data and the frames received from the first and second input ends of the second memory; and
    a selector, comprising:
        a first input end coupled to the second memory for receiving the processed frame;
        a second input end coupled to the frame input end for receiving the original frames;
        a control end for receiving the control signal; and
        an output end coupled to the frame output end, wherein the output end of the selector is coupled to the first input end or to the second input end of the selector based on the control signal;
    wherein the selector directly outputs the original frames when the selector receives the control signal.

2. The image-processing circuit of claim 1, wherein the processed data is an over-drive table.

3. The image-processing circuit of claim 1, wherein the processed frame is an over-drive frame.

4. The image-processing circuit of claim 1, wherein the writing unit stops storing the received frames into the first memory if the writing unit receives the control signal.

5. The image-processing circuit of claim 1, wherein the writing unit continues storing the received frames into the first memory if the writing unit does not receive the control signal.

6. The image-processing circuit of claim 1, wherein the output end of the selector is coupled to the second input end of the selector if the selector receives the control signal.

7. The image-processing circuit of claim 1, wherein the output end of the selector is coupled to the first input end of the selector if the selector does not receive the control signal.

8. The image-processing circuit of claim 1, wherein the first memory includes a dynamic random access memory (DRAM).

9. An image-processing system capable of reducing power consumption, comprising:
    a first memory for storing frames;
    an image-processing circuit comprising
        a frame input end for receiving original frames;
        a frame output end for outputting frames after being processed by the image-processing circuit;
        a memory controller, comprising:
            a writing unit, comprising:
                an input end directly coupled to the frame input end for receiving the original frames;
                a control end for receiving a control signal; and
                an output end coupled to the first memory, wherein the writing unit stores the original frames received from the input end of the writing unit into the first memory via the output end of the writing unit based on the control signal; and
            a reading unit, comprising:
                an input end coupled to the first memory for accessing frames stored in the first memory; and
                an output end for outputting the accessed frames;
        a comparator, comprising:
            a first input end coupled to the output end of the reading unit for receiving frames outputted from the reading unit;
        a second input end coupled to the frame input end for receiving the original frames; and
            an output end coupled to the writing unit for outputting the control signal when a frame received from the first input end of the comparator is identical to a frame received from the second input end of the comparator;
        a second memory for storing a processed data, comprising:
            a first input end coupled to the frame input end for receiving the original frames;
            a second input end coupled to the output end of the reading unit for receiving frames outputted from the reading unit; and
            an output end for outputting a processed frame based on the processed data and the frames received from the first and second input ends of the second memory; and
        a selector, comprising:
            a first input end coupled to the second memory for receiving the processed frame;
            a second input end coupled to the frame input end for receiving the original frames;
            a control end for receiving the control signal; and
            an output end coupled to the frame output end, wherein the output end of the selector is coupled to the first input end or to the second input end of the selector based on the control signal;
        wherein the selector directly outputs the original frames when the selector receives the control signal.

10. The image-processing system of claim 9, wherein the processed data is an over-drive table.

11. The image-processing system of claim 9, wherein the processed frame is an over-drive frame.

12. The image-processing system of claim 9, wherein the writing unit stops storing the received frames into the first memory if the writing unit receives the control signal.

13. The image-processing system of claim 9, wherein the writing unit continues storing the received frames into the first memory if the writing unit does not receive the control signal.

14. The image-processing system of claim 9, wherein the output end of the selector is coupled to the second input end of the selector if the selector receives the control signal.

15. The image-processing system of claim 9, wherein the output end of the selector is coupled to the first input end of the selector if the selector does not receive the control signal.

16. The image-processing system of claim 9, wherein the first memory includes a DRAM.

* * * * *